(12) United States Patent
Clark

(10) Patent No.: US 10,114,470 B2
(45) Date of Patent: *Oct. 30, 2018

(54) USING MOTION SENSING FOR CONTROLLING A DISPLAY

(71) Applicant: Navico Holding AS, Egersund (NO)

(72) Inventor: Jeremiah Clark, Tulsa, OK (US)

(73) Assignee: NAVICO HOLDINGS AS, Egersund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,782

(22) Filed: Nov. 15, 2017

(65) Prior Publication Data

US 2018/0074596 A1  Mar. 15, 2018

Related U.S. Application Data

(63) Continuation of application No. 14/819,907, filed on Aug. 6, 2015, now Pat. No. 9,836,129.

(51) Int. Cl.
| | | |
|---|---|---|
| *G06F 3/00* | (2006.01) | |
| *G01S 15/00* | (2006.01) | |
| *G06F 3/01* | (2006.01) | |
| *G01S 15/96* | (2006.01) | |
| *G01S 7/62* | (2006.01) | |
| *G01S 15/02* | (2006.01) | |

(Continued)

(52) U.S. Cl.
CPC .......... *G06F 3/017* (2013.01); *G01S 7/52004* (2013.01); *G01S 7/6218* (2013.01); *G01S 7/6245* (2013.01); *G01S 7/6281* (2013.01); *G01S 15/025* (2013.01); *G01S 15/87* (2013.01); *G01S 15/96* (2013.01)

(58) Field of Classification Search
CPC .. G01S 7/52004; G01S 7/6218; G01S 7/6281; G01S 7/6245

See application file for complete search history.

(56) References Cited

U.S. PATENT DOCUMENTS

| | | |
|---|---|---|
| 4,829,493 A | 5/1989 | Bailey |
| 4,879,697 A | 11/1989 | Lowrance et al. |
| 5,025,423 A | 6/1991 | Earp |

(Continued)

FOREIGN PATENT DOCUMENTS

| | | |
|---|---|---|
| DE | 102004059619 A1 | 6/2006 |
| EP | 1 561 377 A1 | 8/2005 |

(Continued)

OTHER PUBLICATIONS

McElderry; *At-Sea Observing Using Video-Based Electronic Monitoring*; Prepared for: Electronic Monitoring Workshop Jul. 29-30, 2008; Archipelago Marine Research Ltd.

(Continued)

*Primary Examiner* — Hovhannes Baghdasaryan
(74) *Attorney, Agent, or Firm* — Nelson Mullins Riley & Scarborough LLP

(57) ABSTRACT

Various implementations described herein are directed to a device configured to use motion sensing for controlling a display. The device may include a motion sensing module configured to track orientation of a user on a watercraft and determine a direction of a cast executed by the user based on the tracked orientation of the user. The device may include a display module configured to display one or more sonar images based on the determined direction of the cast executed by the user.

20 Claims, 9 Drawing Sheets

(51) Int. Cl.
*G01S 7/52* (2006.01)
*G01S 15/87* (2006.01)

(56) References Cited

U.S. PATENT DOCUMENTS

| | | |
|---|---|---|
| 5,191,341 A | 3/1993 | Gouard et al. |
| 5,321,391 A | 6/1994 | Fox |
| 5,446,775 A | 8/1995 | Wright et al. |
| 5,537,380 A | 7/1996 | Sprankle, Jr. et al. |
| 5,546,695 A | 8/1996 | Langer |
| 6,222,449 B1 | 4/2001 | Twining |
| 6,225,984 B1 | 5/2001 | Crawford |
| 6,252,544 B1 | 6/2001 | Hoffberg |
| 6,263,147 B1 | 7/2001 | Tognazzini |
| 6,321,158 B1 | 11/2001 | DeLorme et al. |
| 6,411,283 B1 | 6/2002 | Murphy |
| 6,418,080 B2 | 7/2002 | Inouchi |
| 6,421,299 B1 | 7/2002 | Betts et al. |
| 6,459,372 B1 | 10/2002 | Branham et al. |
| 6,567,792 B1 | 5/2003 | Arnold |
| 6,584,722 B1 | 7/2003 | Walls et al. |
| 6,587,740 B2 | 7/2003 | Byrne et al. |
| 6,751,626 B2 | 6/2004 | Brown et al. |
| 6,761,692 B2 | 7/2004 | Angelsen et al. |
| 6,798,378 B1 | 9/2004 | Walters |
| 6,816,782 B1 | 11/2004 | Walters et al. |
| 7,002,579 B2 | 2/2006 | Olson |
| 7,236,426 B2 | 6/2007 | Turner et al. |
| 7,243,457 B1 | 7/2007 | Smith et al. |
| 7,319,992 B2 | 1/2008 | Gaos |
| 7,321,824 B1 | 1/2008 | Nesbitt |
| 7,430,461 B1 | 9/2008 | Michaels |
| 7,652,952 B2 | 1/2010 | Betts et al. |
| 7,710,825 B2 | 5/2010 | Betts et al. |
| 7,722,218 B2 | 5/2010 | Leung |
| 7,729,203 B2 | 6/2010 | Betts et al. |
| 7,755,974 B2 | 7/2010 | Betts et al. |
| 7,812,667 B2 | 10/2010 | Fagg |
| 7,870,496 B1 | 1/2011 | Sherwani |
| 7,890,867 B1 | 2/2011 | Margulis |
| 8,019,532 B2 | 9/2011 | Sheha et al. |
| 8,040,758 B1 | 10/2011 | Dickinson |
| 8,063,540 B2 | 11/2011 | Angelsen et al. |
| 8,452,797 B1 | 5/2013 | Paleja et al. |
| 8,468,164 B1 | 6/2013 | Paleja et al. |
| 9,596,839 B2 | 3/2017 | Bailey |
| 2001/0054961 A1 | 12/2001 | Twining |
| 2002/0035574 A1 | 3/2002 | Dumas |
| 2002/0093541 A1 | 7/2002 | Schileru-Key |
| 2002/0099457 A1 | 7/2002 | Fredlund et al. |
| 2002/0116421 A1 | 8/2002 | Fox et al. |
| 2003/0046689 A1 | 3/2003 | Gaos |
| 2003/0056419 A1 | 3/2003 | Squires et al. |
| 2003/0089020 A1 | 5/2003 | Dirito |
| 2004/0124297 A1 | 7/2004 | Steer |
| 2004/0162830 A1 | 8/2004 | Shirwadkar et al. |
| 2004/0193364 A1 | 9/2004 | Chojnacki |
| 2004/0249860 A1 | 12/2004 | Stechschulte et al. |
| 2005/0037872 A1 | 2/2005 | Fredlund et al. |
| 2005/0102101 A1 | 5/2005 | Beesley et al. |
| 2006/0013066 A1 | 1/2006 | Nishimori et al. |
| 2006/0048434 A1 | 3/2006 | Congel |
| 2006/0119585 A1 | 6/2006 | Skinner |
| 2006/0224940 A1 | 10/2006 | Lee |
| 2006/0265931 A1 | 11/2006 | McFadden et al. |
| 2007/0011334 A1 | 1/2007 | Higgins et al. |
| 2007/0045010 A1 | 3/2007 | Kasperek |
| 2007/0058489 A1 | 3/2007 | Bratcher |
| 2007/0220798 A1 | 9/2007 | Davidson |
| 2008/0126935 A1 | 5/2008 | Blomgren |
| 2008/0165022 A1 | 7/2008 | Herz et al. |
| 2008/0204424 A1 | 8/2008 | Jin et al. |
| 2008/0246627 A1 | 10/2008 | Guazzelli |
| 2009/0064055 A1 | 3/2009 | Chaudhri et al. |
| 2009/0099871 A1 | 4/2009 | Gadodia |
| 2009/0105952 A1 | 4/2009 | Grace et al. |
| 2009/0179789 A1 | 7/2009 | Haughay, Jr. et al. |
| 2009/0240354 A1 | 9/2009 | Davidson |
| 2009/0241636 A1 | 10/2009 | Obori |
| 2009/0249247 A1 | 10/2009 | Tseng et al. |
| 2009/0258710 A1 | 10/2009 | Quatrochi |
| 2009/0271054 A1 | 10/2009 | Dokken |
| 2009/0287409 A1 | 11/2009 | Summers |
| 2009/0295626 A1 | 12/2009 | Su |
| 2010/0049468 A1 | 2/2010 | Papadourakis |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2010/0319235 A1 | 12/2010 | Panaro |
| 2011/0007035 A1 | 1/2011 | Shai |
| 2011/0013484 A1 | 1/2011 | Coleman et al. |
| 2011/0013485 A1 | 1/2011 | Maguire |
| 2011/0019887 A1 | 1/2011 | Roehrig et al. |
| 2011/0025720 A1 | 2/2011 | Jo et al. |
| 2011/0067290 A1 | 3/2011 | Miskatovic |
| 2011/0082644 A1 | 4/2011 | Imasaka et al. |
| 2011/0154183 A1 | 6/2011 | Burns et al. |
| 2011/0208479 A1 | 8/2011 | Chaves |
| 2011/0213515 A1 | 9/2011 | Haymart et al. |
| 2011/0214500 A1 | 9/2011 | Cabrera et al. |
| 2011/0257819 A1 | 10/2011 | Chen et al. |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0047790 A1 | 3/2012 | Hess et al. |
| 2012/0069712 A1 | 3/2012 | Potanin et al. |
| 2012/0106300 A1 | 5/2012 | Maguire |
| 2012/0144384 A1 | 6/2012 | Baek |
| 2012/0144723 A1 | 6/2012 | Davidson |
| 2012/0185801 A1 | 7/2012 | Madonna et al. |
| 2012/0316456 A1 | 12/2012 | Rahman et al. |
| 2012/0316458 A1 | 12/2012 | Rahman et al. |
| 2012/0317167 A1 | 12/2012 | Rahman et al. |
| 2013/0007665 A1 | 1/2013 | Chaudhri et al. |
| 2013/0040714 A1 | 2/2013 | Rosing |
| 2013/0074051 A1 | 3/2013 | Freeman |
| 2013/0096575 A1 | 4/2013 | Olson |
| 2013/0107031 A1 | 5/2013 | Atkinson |
| 2013/0281087 A1 | 10/2013 | Ruhanen et al. |
| 2013/0307720 A1 | 11/2013 | Lilburn |
| 2013/0343151 A1 | 12/2013 | Shiraki et al. |
| 2014/0012587 A1 | 1/2014 | Park |
| 2014/0032468 A1 | 1/2014 | Anandaraj |
| 2014/0071059 A1 | 3/2014 | Girault |
| 2014/0111368 A1 | 4/2014 | Lee et al. |
| 2014/0180566 A1 | 6/2014 | Malhotra |
| 2014/0195297 A1 | 7/2014 | Abuelsaad et al. |
| 2014/0358483 A1 | 12/2014 | da Rosa |
| 2015/0019135 A1 | 1/2015 | Kacyvenski |
| 2015/0051786 A1 | 2/2015 | Wang |
| 2015/0054655 A1 | 2/2015 | Bailey |
| 2015/0054732 A1 | 2/2015 | Bailey |
| 2015/0054828 A1 | 2/2015 | Bailey |
| 2015/0054829 A1 | 2/2015 | Bailey |
| 2015/0055827 A1 | 2/2015 | Bailey |
| 2015/0055930 A1 | 2/2015 | Bailey |
| 2015/0057929 A1 | 2/2015 | Bailey |
| 2015/0057965 A1 | 2/2015 | Gaynor |
| 2015/0057968 A1 | 2/2015 | Bailey |
| 2015/0058020 A1 | 2/2015 | Bailey |
| 2015/0058237 A1 | 2/2015 | Bailey |
| 2015/0058323 A1 | 2/2015 | Bailey |
| 2015/0310524 A1 | 10/2015 | Gospodarek et al. |
| 2016/0125348 A1 | 5/2016 | Dyer et al. |

FOREIGN PATENT DOCUMENTS

| | | |
|---|---|---|
| EP | 2 613 223 A1 | 7/2013 |
| JP | 2004 207812 A | 7/2004 |
| JP | 2006-158239 A | 6/2006 |
| JP | 2010 193284 A | 9/2010 |
| JP | 2011 139647 A | 7/2011 |

(56) References Cited

FOREIGN PATENT DOCUMENTS

| WO | WO 1998/002037 A1 | 1/1998 |
|----|-------------------|--------|
| WO | WO 2004/088572 | 10/2004 |
| WO | WO 2010/056392 | 5/2010 |
| WO | WO 2012/170163 | 12/2012 |

OTHER PUBLICATIONS

Allen, et al.; Upper Extremity Kinematic Trends of Fly-Casting; Establishing the Effects of Line Length; Sports Biomechanics; vol. 7, No. 1; Jan. 1, 2008; pp. 38-53.
First look at new Mio Link ANT +/Bluetooth Smart optical heart rate wrist band; http://www.dcrainmaker.com/2014/01/mio-link-first-look.html; Jan. 6, 2014 (accessed Mar. 3, 2014).
SAS, "SAS BI Dashboard 4.31 User's Guide", Second Edition, by SAS Electronic book, Aug. 1, 2012, downloaded at http://support.sas.com/documentation/cdl/en/bidbrdug/65580/PDF/default/bidrdrug.pdf.
PCT International Search Report and Written Opinion; PCT/IB2013/060285, dated Feb. 18, 2014.
PCT International Search Report and Written Opinion; PCT/IB2014/063974, dated Dec. 2, 2014.
PCT International Search Report and Written Opinion; PCT/IB2014/063975, dated Dec. 3, 2014.
PCT International Search Report and Written Opinion; PCT/IB2014/063976, dated Dec. 12, 2014.
PCT International Search Report and Written Opinion; PCT/IB2014/063979, dated Jan. 7, 2015.
PCT International Search Report and Written Opinion; PCT/IB2014/063980, dated Jan. 5, 2015.
PCT International Search Report and Written Opinion; PCT/IB2014/063982, dated Dec. 22, 2014.
PCT International Search Report and Written Opinion; PCT/IB2014/063983, dated Mar. 5, 2015.
PCT International Search Report and Written Opinion; PCT/US2013/047645, dated Sep. 27, 2013.
PCT International Search Report and Written Opinion; PCT/US2013/047869, dated Oct. 21, 2013.
PCT International Search Report and Written Opinion; PCT/US2013/047926, dated Oct. 11, 2013.
PCT International Search Report and Written Opinion; PCT/US2013/048129, dated Oct. 17, 2013.
PCT International Search Report and Written Opinion; PCT/US2013/048177, dated Oct. 21, 2013.
PCT International Search Report and Written Opinion; PCT/IB2014/063973, dated Nov. 28, 2014.
PCT International Search Report and Written Opinion; PCT/IB2014/063981, dated Feb. 10, 2015.
PCT International Search Report and Written Opinion; PCT/IB2014/063978, dated Dec. 19, 2014.
PCT International Search Report and Written Opinion; PCT/IB2014/063977, dated Nov. 28, 2014.

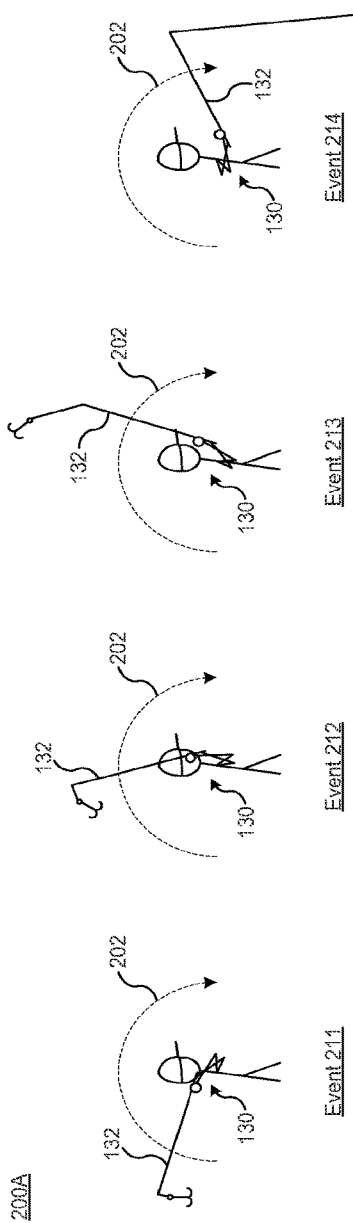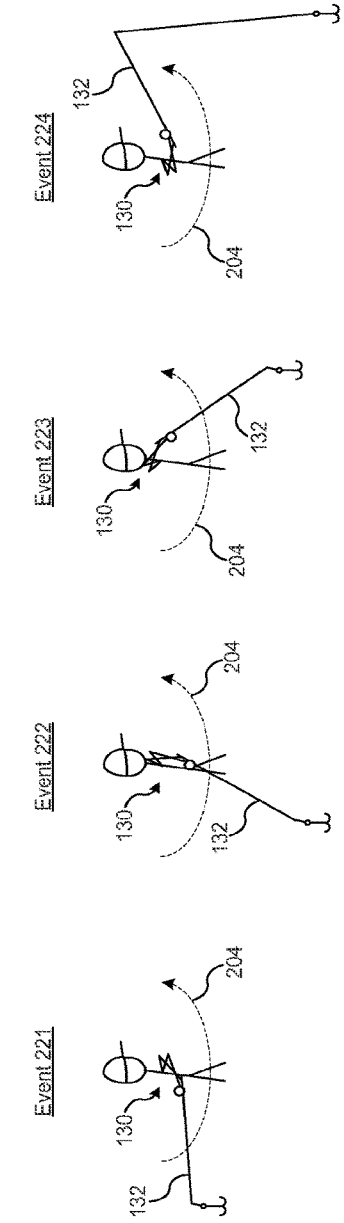

USING MOTION SENSING FOR CONTROLLING A DISPLAY

CROSS-REFERENCE TO RELATED APPLICATION

This application claims priority to and is a continuation of U.S. patent application Ser. No. 14/819,907, entitled "Using Motion Sensing for Controlling a Display", filed Aug. 6, 2015, the contents of which is hereby incorporated by reference in its entirety.

BACKGROUND

This section is intended to provide information to facilitate an understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

When trolling, sonar may be used to locate fish. Sometimes, an angler's vessel may be equipped with a sonar device to provide an underwater view. Sonar images may be displayed on a marine display.

SUMMARY

Described herein are implementations of technologies for a device configured to use motion sensing for controlling a display. The device may include a motion sensing module configured to track orientation of a user on a watercraft and determine a direction of a cast executed by the user based on the tracked orientation of the user. The device may include a display module configured to display one or more sonar images based on the determined direction of the cast executed by the user.

Described herein are also implementations of technologies for an apparatus configured to use motion sensing for controlling a display. The apparatus may include a motion sensor configured to track movement of an angler on a watercraft and determine a direction of a casting gesture performed by the angler based on the tracked movement of the angler. The apparatus may include a display component configured to display one or more sonar images based on the determined direction of the casting gesture performed by the angler.

Described herein are implementations of various technologies for a computer-readable medium having stored thereon a plurality of computer-executable instructions which, when executed by a computer, cause the computer to use motion sensing for controlling a display. The instructions may cause the computer to receive motion capture data from one or more motion sensors configured to track movement of an angler on a watercraft. The instructions may cause the computer to determine a direction or intensity of a cast by the angler based on the motion capture data. The instructions may cause the computer to identify a target area of the cast based on the determined direction of the cast by the angler. The instructions may cause the computer to automatically display one or more sonar images on a display component in relation to the identified target area of the cast by the angler.

Described herein are other implementations of technologies for a computer-readable medium having stored thereon a plurality of computer-executable instructions which, when executed by a computer, cause the computer to use motion sensing for controlling a display. The instructions may cause the computer to receive first data from a first motion sensor configured to determine a direction of a cast by an angler. The instructions may cause the computer to receive second data from a second motion sensor configured to determine an intensity of the cast by the angler. The instructions may cause the computer to identify a target area of the cast based on the determined direction of the cast and the determined intensity of the cast. The instructions may cause the computer to automatically display one or more sonar images on a display component in relation to the identified target area of the cast.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Moreover, the claimed subject matter is not limited to implementations that solve any or all disadvantages noted in any part of this disclosure.

BRIEF DESCRIPTION OF THE DRAWINGS

Implementations of various techniques are described herein with reference to the accompanying drawings. It should be understood, however, that the accompanying drawings illustrate only the various implementations described herein and are not meant to limit the scope of various techniques described herein.

FIGS. 2A-2B illustrate diagram views of casting gestures in accordance with various implementations described herein.

DETAILED DESCRIPTION

Various implementations described herein are directed to using motion sensing for controlling a display, including display of sonar images. In one implementation, various techniques described herein refer to using a motion sensing module to track orientation of an angler on a watercraft and to determine a direction of a cast executed by the angler based on the tracked orientation of the angler. In some implementations, the motion sensing module may track movements of the angler on the watercraft and detect intensity of the cast executed by the angler based on the tracked movements of the angler. Further, based on the cast by the angler, a marine display may be configured to automatically display one or more sonar images associated with a targeted area that the angler is presently casting toward. This technique may provide the angler an automatic view of the fish in the water column in relation to the target area of the cast.

Various implementations of using motion sensing for controlling a display will now be described in reference to FIGS. 1A-5.

Figure 1A:
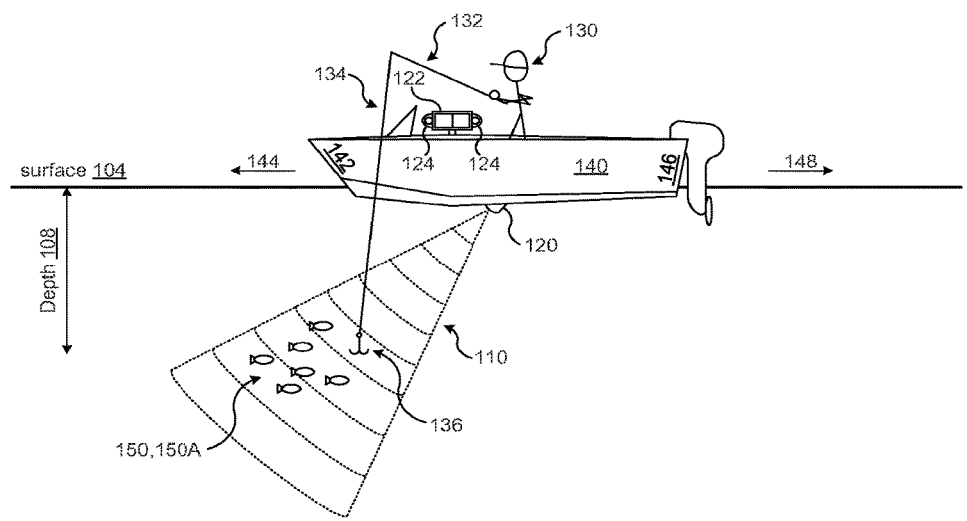
FIGS. 1A-1D illustrate views of using motion sensing for controlling a display in accordance with various implementations described herein.
Figure 1B:
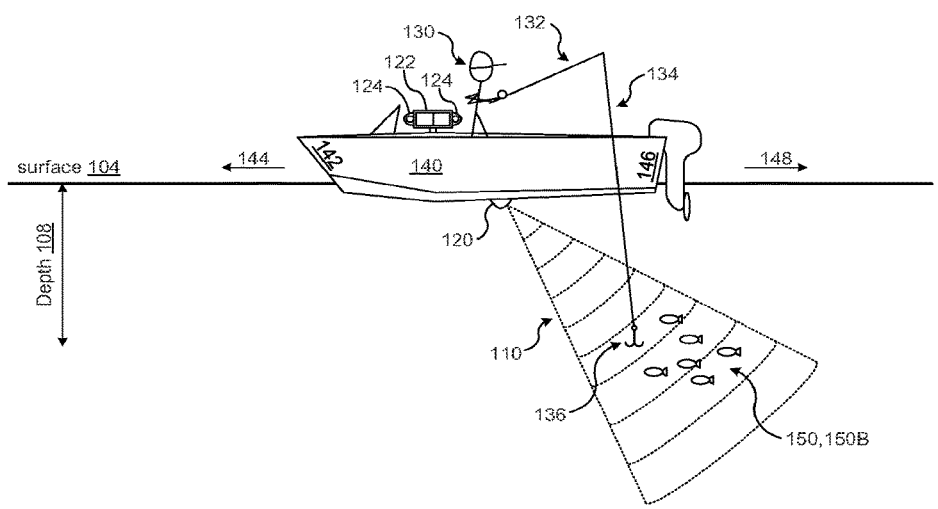
Figure 1C:
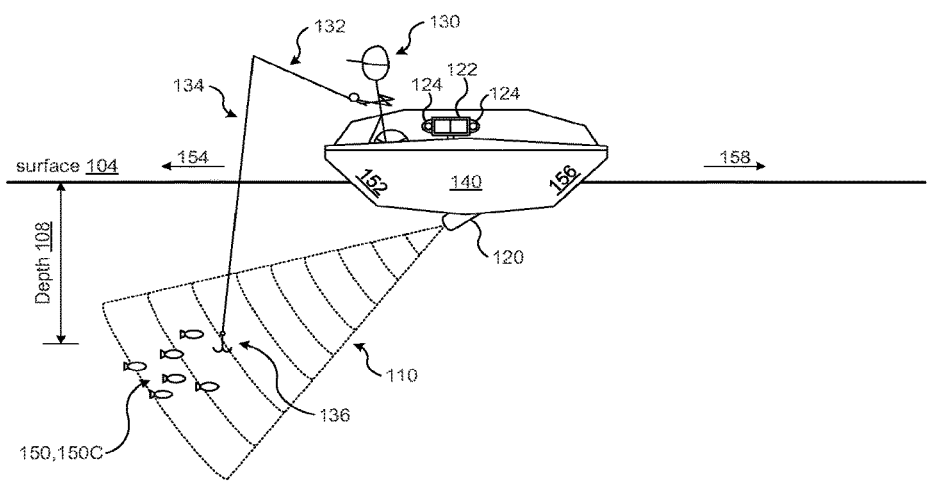
Figure 1D:
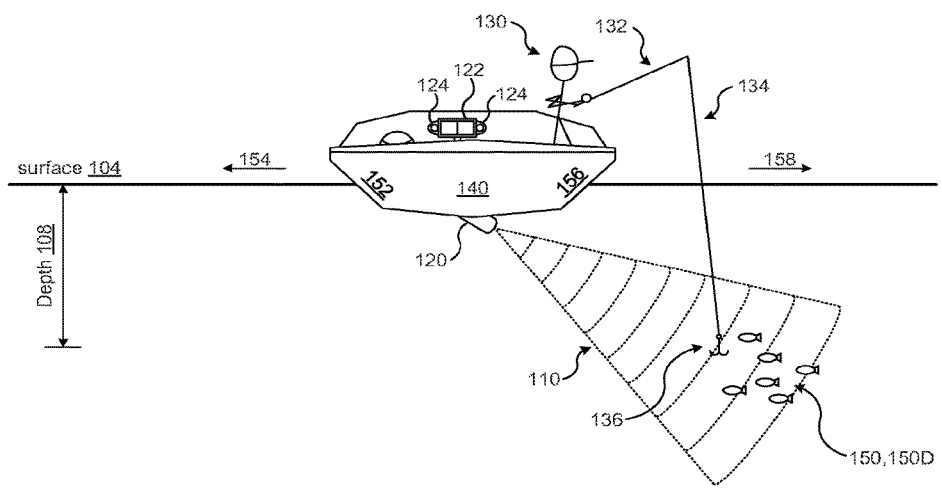

FIGS. 1A-1D illustrate views of using motion sensing for controlling a display in accordance with various implementations described herein. In particular, FIG. 1A illustrates a view of a system 100 for using a sonar transducer 120 directed in a forward (fore) direction 144 relative to a bow 142 of a watercraft 140. FIG. 1B illustrates another view of the system 100 for using the sonar transducer 120 directed in a rear (aft) direction 148 relative to a stern 146 of the watercraft 140. FIG. 1C illustrates another view of the system 100 for using the sonar transducer 120 directed in a starboard (right) direction 154 relative to a starboard side 152 of the watercraft 140. FIG. 1D illustrates another view of the system 100 for using the sonar transducer 120 directed in a port (left) direction 158 relative to a port side 156 of the watercraft 140. The watercraft 140 may be referred to as a vessel, boat, ship, etc., and the sonar transducer 120 may be positioned below a surface 104 of a body of water 102 in which the watercraft 140 is deployed.

The sonar transducer 110 may be configured to provide various angular ranges of view in various directions, such as, e.g., approximately a 90° vertical view along with approximately a 15° to 30° horizontal view. The various angular ranges of view may include or at least be extended to include angular ranges of vertical views from/between 0° to more than 90° along with angular ranges of horizontal views from/between 0° to 180°, or in some cases, 360° view. The sonar transducer 110 may be configured to manually or automatically rotate (or pivot or directionally adjust) vertically and/or horizontally so as to rotate the view (i.e., field of view).

During operation, the sonar transducer 120 may be configured to use sonar for imaging various environmental features (e.g., fish, plants, rocks, lures, bait, etc.) in the body of water 102. This imaging may include mapping an underwater environment below the surface 104 of the body of water 102 between the surface 104 and a bottom or floor 106 of the body of water 102. For instance, this imaging may include various images of fish or schools of fish 150 captured beneath the watercraft 140 by the sonar transducer 120 directed in any direction, such as the forward direction 144 with the sonar beam 110, as shown in reference to FIG. 1A. In some implementations, the sonar transducer 120 may be configured to generate one or more two-dimensional (2D) sonar images of the underwater environment in a column of water. In some other implementations, the sonar transducer 120 may be configured to generate one or more three-dimensional (3D) sonar images of the underwater environment in a column of water.

In reference to FIG. 1A, a computing device 122 may be coupled/mounted to the watercraft 140 and used to display images associated with the sonar transducer 120, which may be forward facing to provide sonar images of the underwater environment in the forward (fore) direction 144 relative to the bow 142 of the watercraft 140. Further, the computing device 122 may include at least one processing component (e.g., processor) and memory including instructions configured to cause the processor to perform various actions and/or functions including display of images associated with the sonar transducer 120. The computing device 122 may include various types of computing devices, such as, e.g., marine display, marine electronics device, multi-function display (MFD), smart phone, etc. Further, the computing device 122 may be configured to simultaneously display multiple images associated with the sonar transducer 120 in various display modes of operation, including, e.g., a split screen mode of operation.

During trolling, the computing device 122 may be used to display sonar images in relation to a direction of a cast executed/performed by a user or angler 130 (e.g., boat pilot, fisherman, etc.). In one implementation, the computing device 122 may include one or more motion sensing modules 124 configured to track orientation of the angler 130 on the watercraft 140 and determine a direction of a cast executed by the angler 130 based on the tracked orientation of the angler 130. Further, the computing device 122 may be configured to display the one or more sonar images based on the determined direction of the cast executed by the angler 130. In another implementation, the motion sensing module 124 may be configured to track movements of the angler 130 on the watercraft 140 and detect intensity of the cast executed by the angler 130 based on the tracked movements of the angler 130. Further, the computing device 122 may be configured to display one or more sonar images based on the detected intensity of the cast. Further, in some other instances, the computing device 122 may be configured to display one or more sonar images based on the detected intensity of the cast along with the determined direction of the cast.

The motion sensing modules 124 may be referred to as motion sensors, components, or devices. The motion sensing modules 124 may include one or more image capture components including at least one of a video camera, such as, e.g., a 2D and/or a 3D video camera, and a depth sensing camera, such as e.g., an infrared (IR) and/or radio frequency (RF) depth sensing camera.

Further, as shown in FIG. 1A, the sonar transducer 120 may be used to locate and/or track fish 150, 150A in the body of water 102 beneath the watercraft 140 at various depths 108 proximate to the bow 142 of the watercraft 140. Similarly, as further shown in FIGS. 1B, 1C, and 1D, the sonar transducer 120 may be used to locate and/or track fish 150B, 150C, and 150D in the body of water 102 beneath the watercraft 140 at the various depths 108 proximate to the stern 146 (FIG. 1B), the starboard side 152 (FIG. 1C), and the port side 156 (FIG. 1D) of the watercraft 140, including any relative position in between the bow 142, the starboard 152, the stern 146, and the port 156. As such, the tracked orientation of the angler 130 may refer to a position of the angler 130 on the watercraft 140 in relation to at least one of the bow (fore side), stern (aft side), port (left side), and starboard (right side) of the watercraft 140. Further, the orientation of the user or angler 130 may refer to a forward facing direction of the angler 130 on the watercraft 140 in relation to at least one of the bow (fore side), stern (aft side), port (left side), and starboard (right side) of the watercraft 140. Moreover, the tracked movement may refer to transitioning of the angler 130 on the watercraft 140 from a first position to a second position, wherein the second position is different than the first position.

In some implementations, the computing device 122 may be used to determine a depth of the fish 150 in the body of water 102 near the watercraft 140. Once the depth 108 of the fish 150 is determined, then the angler 130 may cast a lure or bait 136 in the body of water 102 at the determined depth 108. For instance, during trolling, the lure or bait 136 may be coupled to a casting device, such as a rod 132 (e.g., fishing rod or pole), via a line 134 (e.g., fishing line). The rod 132 may be configured for casting the lure or bait 136 by the angler 130. As shown in FIGS. 1A-1D, the angler 130 may cast the lure or bait 136 into the body of water 102 proximate to the bow side 142 (FIG. 1A), the stern side 146 (FIG. 1B), the starboard side 152 (FIG. 1C), and/or the port side (FIG. 1D) of the watercraft 140, while the angler 130 is positioned within the watercraft 140.

In some implementations, the sonar transducer 120 may be electrically coupled to the computing device 122 via one or more electrical wires or cables (not shown) passing through the watercraft 140. The computing device 122 may be configured to record sonar data received from the sonar transducer 120 via the electrical cables. Further, the computing device 122 may be configured to control operation of the watercraft 140. In some instances, operation of the watercraft 140 may be controlled by the computing device 122 including user interaction with the computing device 122. In some other instances, operation of the watercraft 140 may be controlled via user interaction with a foot-pedal (not shown) positioned on the watercraft 140.

In various implementations, the sonar transducer 120 may be referred to as a forward scanning sonar transducer having a forward spotlight scan transducer. In some other implementations, the sonar transducer 120 may include an array of multiple sonar transducers having, e.g., one or more of a right forward scanning element, a left forward scanning element, a conical sonar element, and a bar downscan sonar element. In this instance, the multiple sonar scanning elements are each capable of generating a separate sonar beam, wherein each sonar beam may include one or more of a conical beam projection and a linear beam projection. Further, each of the sonar beams may include a conical downscan beam projection having a coverage area of a beam produced by a circular downscan transducer. Still further, in some instances, each of the sonar beams may include a linear downscan beam projection having a coverage area of a beam produced by a linear downscan transducer.

In various implementations, each sonar transducer element may be configured to use sonar technology to evaluate attributes of various target objects by interpreting echoes from sound waves. Further, each sonar transducer element may be configured to actively generate low and/or high frequency sound waves and evaluate echoes received back to thereby measure time intervals between sending signals and receiving corresponding echoes to determine distance to target objects. Each sonar transducer element may be configured to convert energy into sound waves using piezoelectric transducers or capacitive transducers that are configured to convert electrical energy into sound. Each sonar transducer element may be configured to use piezoelectric crystals that include a property of changing size when voltage is applied, whereby applying an alternating current (AC) across the piezoelectric crystals may cause oscillations at high frequencies, to thereby generate high frequency sound waves. In some instances, focusing sound waves generated by each sonar transducer element may be determined by an area and shape of each sonar transducer element, a sound wave frequency of each sonar transducer element, and a sound velocity of the propagation medium, such as a body of water. In some instances, each sonar transducer element may use piezoelectric crystals configured as transceivers to transmit and detect sound waves in one or more elements, such as propagating sound waves and receiving echoing sound waves.

Generally, the term sonar (i.e., SOund Navigation And Ranging) may refer to various techniques for propagating sound underwater to detect objects on or under a surface of a body of water, such as fish, lures, plants, rocks, sea floor, etc. One type of sonar technology refers to active sonar that is configured to emit pulses of sound waves while receiving echoes, which refers to pinging. Sonar may be used to determine acoustic locations and/or measurements of echo characteristics for targets and objects in a body of water. Further, acoustic frequencies used in sonar based devices may vary from low frequency (i.e., infrasonic) to high frequency (i.e., ultrasonic).

In some implementations, the sonar transducer 120 may include use of one or more sensors (not shown). For instance, the one or more sensors may include a dedicated sensor (e.g., water sensor) configured for sensing deployment and/or removal of the sonar transducer 120 in and/or from the body of water 102. In this instance, the dedicated sensor may include electrode terminals (not shown) configured to activate (e.g., power-up) the sonar transducer 120 when the watercraft 140 is deployed in water. In some instances, the electrode terminals may be configured to deactivate (e.g., power-down) the sonar transducer 120 when the watercraft 140 is removed or withdrawn from water. Further, the one or more sensors may include one or more environmental sensors, such as a temperature sensor and depth finding sensor.

FIGS. 2A-2B illustrate various casting gestures 200A, 200B in accordance with various implementations described herein.

In some implementations, the motion sensing modules 124 of FIGS. 1A-1D may be configured to track gestures (i.e., movements, motions, etc.) of the angler 130 on the watercraft 140. The gestures may refer to casting gestures 200A, 200B associated with a cast performed and/or executed by the angler 130. In some examples, as shown in FIG. 2A, the casting gestures may refer to an overhead casting gesture 200A, and in some other examples, as shown in FIG. 2B, the casting gestures may refer to a side casting gesture 200B. In similar instances, various other types of casting gestures may be considered as casting gestures, such as, e.g., underhand casting gestures.

In some implementations, the motion sensing modules 124 of FIGS. 1A-1D may be configured to track a first sequence of casting events during an overhead casting gesture 200A, which may be represented by an overhead sweeping arc movement 202 by the angler 130. For instance, in a first event 211, for the overhead casting gesture 200A, the angler 130 may start in a first position, e.g., with arms back and the rod 132 extended behind the angler 130. In a second event 212, for the overhead casting gesture 200A, the angler 130 may move to a second position, e.g., with arms above and the rod 132 extended above the angler 130. In a third event 213, for the overhead casting gesture 200A, the angler 130 may move to a third position, e.g., with arms forward and the rod 132 extended in front of the angler 130. In a fourth event 214, for the overhead casting gesture 200A, the angler 130 may move to a fourth position, e.g., with arms in front and the rod 132 extended in a forward position in front of the angler 130.

In some implementations, the motion sensing modules 124 of FIGS. 1A-1D may be configured to track a second sequence of casting events during a side casting gesture 200B, which may be represented by side sweeping arc movement 204 by the angler 130. For instance, in a first event 221, for the side casting gesture 200B, the angler 130 may start in a first position, e.g., with arms back and to the side and the rod 132 extended behind and to the side of the angler 130. In a second event 222, for the side casting gesture 200A, the angler 130 may move to a second position, e.g., with arms moving forward along the side and the rod 132 extended to the side of the angler 130. In a third event 223, for the side casting gesture 200A, the angler 130 may move to a third position, e.g., with arms moving further forward along the side and the rod 132 extended further to the side of the angler 130. In a fourth event 224, for the side casting gesture 200A, the angler 130 may move to a fourth position, e.g., with arms in front and the rod 132 extended in a forward position in front of the angler 130.

In various implementations, the motion sensing module 124 may be configured to determine a range of the cast (or casting gesture) based on the detected intensity of the cast (or casting gesture). A range as used herein may refer to how far or what distance the fishing lure or bait travels after casting. The motion sensing module 124 may be configured to identify a target area of the cast (or casting gesture) based on the determined range of the cast (or casting gesture) along with the determined direction of the cast (or casting gesture). The target area of the cast may be an approximate location or area of where the fishing lure or bait may hit the water. The motion sensing module 124 may be configured to automatically display the one or more sonar images that may correspond to the identified target area of the cast (or casting gesture). Further, the intensity of the cast (or casting gesture) may refer to a speed of a casting body part of the angler 130 during the cast (or casting gesture). The speed of the cast (or casting gesture) may be determined based on a rate of change of a transitional movement of the casting body part of the angler 130 over a distance from a first position to a second position during a time period of the cast (or casting gesture), wherein the second position is different than the first position.

Figure 2C:
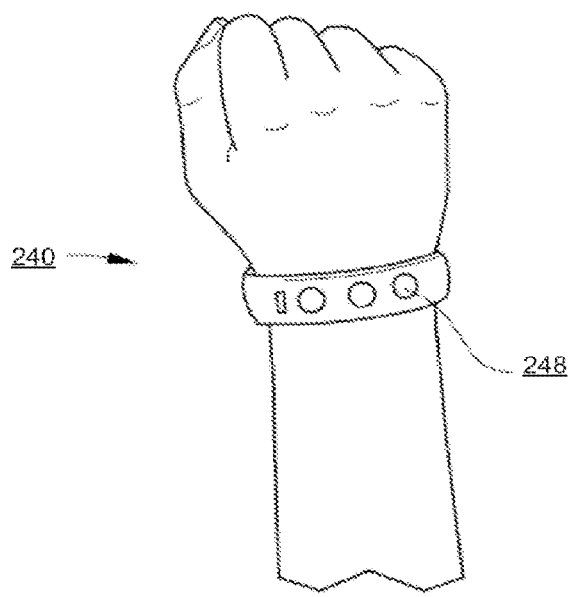
FIGS. 2C-2D illustrates various diagram views of a wearable motion sensing device in accordance with various implementations described herein.
Figure 2D:
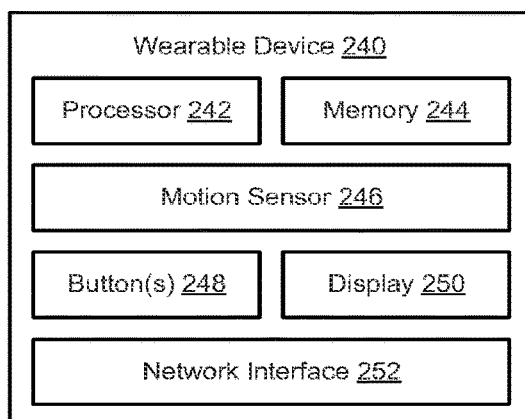

FIGS. 2C-2D illustrate diagram views 200C, 200D of a wearable motion sensing device 240 in accordance with various implementations described herein.

In some implementations, the angler 130 may wear a motion sensing device 240 on a movable body part, such as a wrist, hand, etc., as shown in FIG. 2C. The wearable device 240 may include a processor 242, memory 244, and at least one motion sensor 246. The at least one motion sensor 246 may include one or more accelerometers, gyroscopes, muscle activity sensors, any other type of motion sensor, or any combination of various types of motion sensors. The at least one motion sensor 246 may be configured to capture motion data and/or any type of motion sensing data.

In various implementations, the processor 242 may include software configured to detect one or more user commands for operating a marine electronics device, such as, e.g., marine display, MFD, etc. The user commands may be detected using one or more buttons 248, using the motion sensor 246, or both. For instance, if a user presses a button 248 on the wearable device 240, the wearable device 240 may transmit a user command (or data related to the user command) to a marine electronics device. Further, in some instances, the wearable device 240 may include a display 250. The display 250 may include various types of light emitting diodes (LEDs), and as such, the display 250 may include a liquid crystal display (LCD).

In some situations, the processor 242 may include software configured to detect (or determine) an intensity of a cast by the angler 130. For instance, based on the intensity of the cast, a type of lure and a type of line/reel used, the processor 242 may be able to calculate an approximate distance of the cast. This information may be transmitted to a computing device (e.g., a marine display, MFD, etc.), and this information may be used to determine a range output for the display. For instance, the range may be from 20 ft. for light cast to 100 ft. for a hard cast.

In various implementations, the wearable device 240 may be configured to use wireless technology, such as, e.g., Bluetooth, Wi-Fi, cellular technology (such as GSM or CDMA), satellite communication, and/or any other type of wireless technology. In some instances, the wearable device 240 may be wirelessly connected to a marine electronics device via a network interface 252. In other instances, the wearable device 240 may be wirelessly connected to any computer system via the network interface 252, including a portable computer system, a smart phone device, a remote computer, a remote server, a cloud server, and the like. Further, the wearable device 240 may be connected to any computing device with a wired or wireless connection via the network interface 252.

Figure 3:
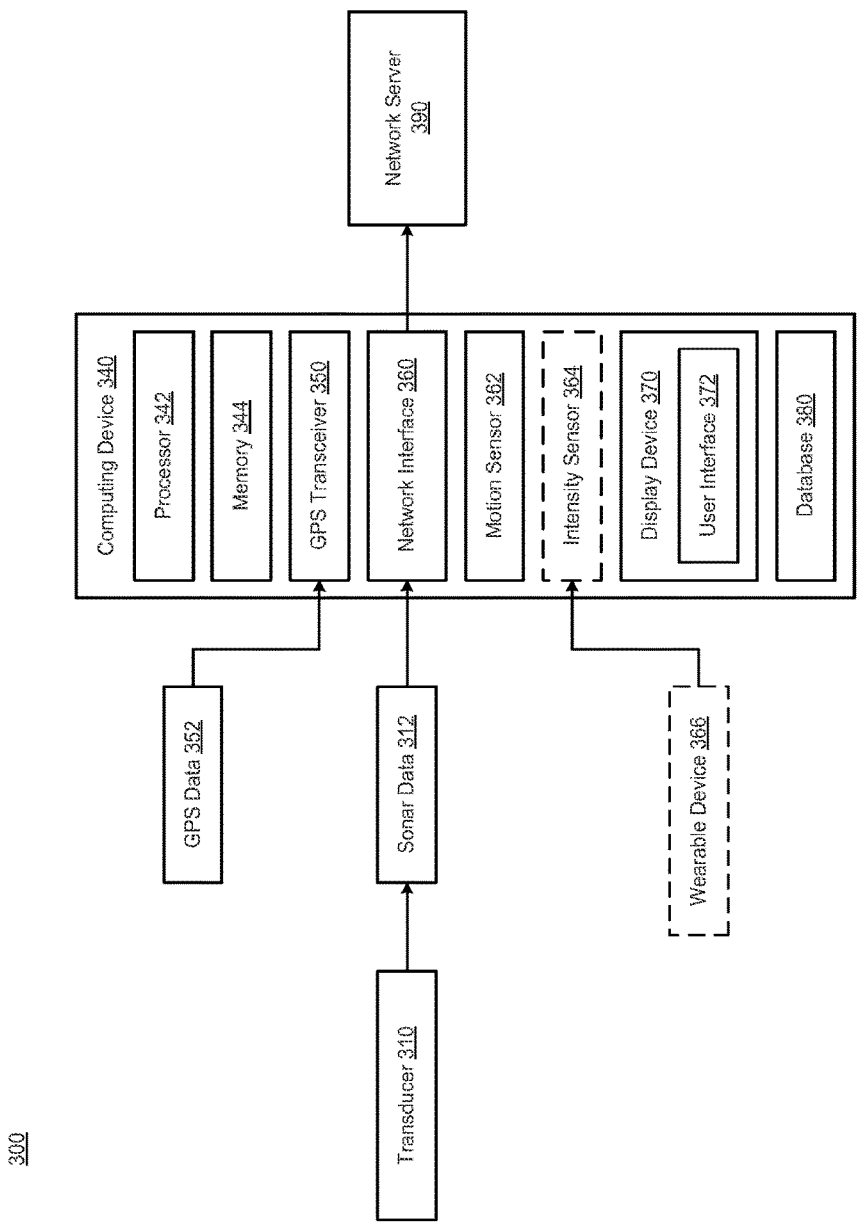
FIG. 3 illustrates a system for using motion sensing to control a display in accordance with various implementations described herein.

FIG. 3 illustrates a diagram of a sonar based system 300 for using motion sensing to control display of sonar images on a marine display in accordance with various implementations described herein. In particular, FIG. 3 illustrates a diagram of a system 300 having at least one transducer 310 and motion sensing capabilities using at least one motion sensor 362 and at least one optional intensity sensor 364. The system 300 may implement use of a transducer array (not shown) having multiple transducers 310 along with use of motion sensing capabilities.

In various implementations, the transducer 310 may be configured to rotate and/or pivot to provide multiple fields of horizontal views, such as 360° views along the horizontal (e.g., x-axis). These multiple fields of horizontal views may include forward (fore) facing views (e.g., facing toward a bow of a watercraft), rear (aft) facing views (e.g., facing toward a stern of a watercraft), starboard (right) facing views (e.g., facing toward a starboard side of a watercraft), and port (left) facing views (e.g., facing toward a port side of a watercraft). Further, the transducer 310 may be configured to rotate and/or pivot to provide multiple fields of vertical views at various depths, such as angular views from 0° to 90° along the vertical (e.g., y-axis).

In some implementations, the transducer 310 may implement use of a spotlight transducer array having multiple scanning transducers. In some other implementations, the transducer 310 may include multiple transducer elements having one or more of a right scanning transducer, a left scanning transducer, a down scanning transducer, and a conical down beam transducer.

As shown in reference to FIG. 3, the system 300 may include a computing device 340 and a network server 390. In various implementations, the transducer 310 may be configured to directly provide sonar data 312 to the computing device 340, and the computing device 340 may be configured to receive the sonar data 312 from the transducer 310 over a wired or wireless network via a network interface 360. For instance, the computing device 340 may be configured to receive motion capture data from one or more motion sensors 362 that are configured to track movement of an angler on a watercraft. The computing device 340 may be configured to determine (or detect) a direction of a cast by the angler based on the motion capture data. The computing device 340 may be configured to identify a target area of the cast based on the determined (or detected) direction of the cast by the angler. Further, the computing device 340 may be configured to automatically display (or focus the display of) one or more sonar images on the display 370 in relation to the identified target area of the cast by the angler.

The motion capture data may include full-body 3D motion capture data in relation to movement of the angler on the watercraft. The motion capture data may also include facial recognition data of the angler to determine a forward facing orientation of the angler. Further, tracking movement of the angler on the watercraft may include tracking one or more gestures of the user on the watercraft including casting gestures, such as, e.g., overhead casting gestures and side casting gestures.

In some implementations, the computing device 340 may be configured to determine (or detect) an intensity of the cast by the angler based on the motion capture data. The computing device 340 may be configured to identify a target area of the cast based on the determined (or detected) intensity of the cast by the angler. The computing device 340 may be configured to automatically display (or focus the display of) one or more sonar images on the display 370 in relation to the identified target area of the cast by the angler. In this instance, determining intensity of the cast watercraft may include determining a range of the cast based on the determined (or detected) intensity of the cast. In some situations, based on the intensity of the cast, a type of lure and a type of line/reel used, the computing device 340 may be able to calculate an approximate distance of the cast. This information may be processed by to the computing device 140, and the computing device 140 may use this information to determine a range output for the display. For instance, the range may be from 20 ft. for light cast to 100 ft. for a hard cast.

In some implementations, the computing device 340 may be configured to receive first data from a first motion sensor (e.g., the motion sensor 362) that may be configured to determine (or detect) a direction of a cast by an angler. The computing device 340 may be configured to receive second data from a second motion sensor (e.g., the motion sensor 362 or the intensity sensor 364 configured to determine (or detect) an intensity of the cast by the angler. Further, the computing device 340 may be configured to process the first data and/or the second data to identify a target area of the cast based on the determined (or detected) direction of the cast and/or the determined (or detected) intensity of the cast. The computing device 340 may be configured to automatically display (or focus the display of) one or more sonar images on the display 370 in relation to the identified target area of the cast. Accordingly, the computing device 340 may be configured to use motion sensor data as a filtering mechanism to display sonar images in relation to a side of the watercraft, such as, e.g., front (fore), back (stern or aft), right (starboard side), left (port side), or some combination thereof.

The first data and/or second data may include full-body 3D motion capture data in relation to orientation of the angler. The first data and/or second data may also include facial recognition data associated with a forward facing position of the angler. The direction of the cast may be based on the orientation of the angler or the forward facing position of the angler during the cast, or both. Further, determining intensity of the cast by the angler may include determining a range of the cast based on the detected intensity of the cast by the angler. Optionally, receiving second data from the second motion sensor may include receiving acceleration data from a wearable wrist sensor or device 366 worn by the angler during the cast. As described in reference to FIGS. 2C-2D, the angler may wear a motion sensing device 366 on a movable body part, such as a wrist, hand, etc., and the motion sensing device 366 may include one or more accelerometers, gyroscopes, muscle activity sensors, etc. Further, the motion sensing device 366 may be configured to capture and transmit motion capture data to the intensity sensor 364.

In various implementations, the motion sensor 362 may be configured to track multiple movements (and/or orientations and/or casting intensities) of multiple anglers on a watercraft, and the computing device 340 may be configured to process the data and information associated with each of the multiple anglers. Further, the intensity sensor 364 may be configured to receive data and information from multiple anglers, with each angler wearing a wearable device 366, and track an intensity of each cast performed or executed by each angler. As such, motion sensing data from each angler may be used to determine (or detect) multiple target areas for each angler based on the determined (or detected) direction and/or determined (or detected) intensity of each angler's cast. Further, the computing device 340 may be configured to display multiple sonar images on the display 370 for each angler, e.g., in a split-screen mode of operation. Still further, the display 370 may comprise multiple displays positioned throughout the watercraft, and the computing device 340 may be configured to display particular sonar images for particular anglers depending on each angler's tracked position on the watercraft.

The computing device 340 may include the processor 342 and memory 344 having instructions that cause the processor 342 to display images associated with the sonar data on a display component or device 370. Further, the instructions may cause the processor 342 to simultaneously display images associated with current and previous sonar data 312 on the display device 370 in a split screen mode of operation, such as, e.g., left-side screen display of various images associated with current sonar data and right-side screen display of various images associated with previous sonar data. Further, the computing device 340 may be configured to create/generate sonar logs associated with the sonar data 312, including previously recorded sonar data.

In some implementations, the computing device 340 may be configured to store/record sonar data 312 and/or sonar logs in one or more databases (e.g., database 380). The computing device 340 may be configured to upload the sonar data 312 and/or sonar logs to the network server 390, such as, e.g., cloud server or other network server, via network interface 360. The computing device 340 may be configured to store/record multiple sonar logs and create/generate a map therefrom. The computing device 340 and/or the network server 390 may be configured to create/generate one or more maps by stitching/combining/joining multiple sonar logs together. The computing device 340 may be configured to receive geo-coordinate data, such as global positioning system data (i.e., GPS data), via a GPS transceiver 350 and associate the received GPS data to the sonar data 312, sonar logs, and/or maps at any time, including prior to upload. The wired or wireless network may include any type of wired or wireless communication network and/or cloud based network.

In various implementations, the computing device 340 may be configured as a special purpose machine for interfacing with one or more transducers 310. The computing device 340 may include standard elements and/or components, including the processor 342, the memory 344 (e.g., non-transitory computer-readable storage medium), at least one database 380, power, peripherals, and various other computing elements and/or components that may not be specifically shown in FIG. 3. Further, the computing device 340 may include the display device 370 (e.g., monitor or other display) that may be used to provide a user interface (UI) 372, including a graphical user interface (GUI). In FIG. 3, the display 370 is shown as an incorporated part of the computing device 340; however, the display 370 may be implemented as a separate component. Further, the UI 372 may be used to receive one or more preferences from a user of the display device 370 for managing or utilizing the system 300, including interfacing with one or more transducers 310. As such, a user may setup desired behavior of the computing system 300 and/or transducer(s) 310 via user-selected preferences using the UI 372 associated with the display device 370. Various elements and/or components of the system 300 that may be useful for the purpose of implementing the system 300 may be added, included, and/or interchanged, in manner as described herein.

Figure 4:
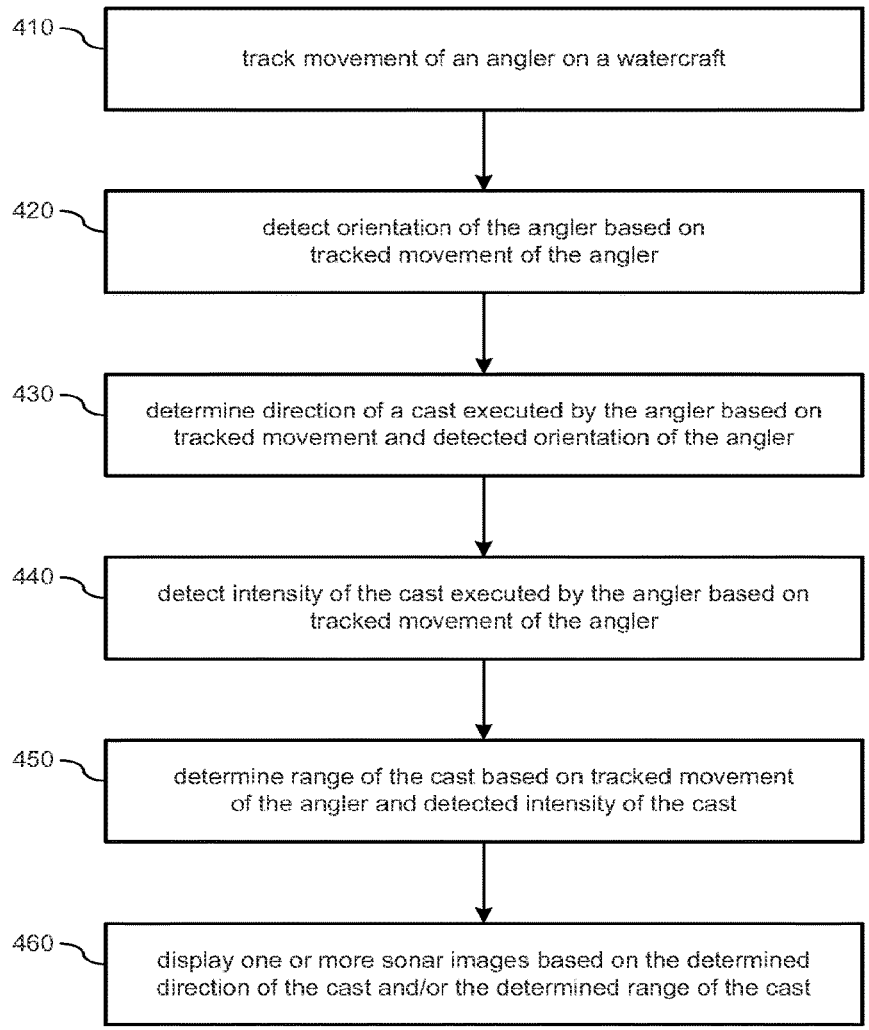
FIG. 4 illustrates a method for using motion sensing for controlling a display in accordance with various implementations described herein.

FIG. 4 illustrates a method for using motion sensing for controlling a display in accordance with various implementations described herein. It should be understood that while method 400 indicates a particular order of execution of operations, in some instances, certain portions of the operations may be executed in a different order, and on different systems. Further, in some other instances, additional operations or steps may be added to method 400. Similarly, some operations or steps may be omitted.

In some implementations, method 400 may be performed or executed by various types of computing devices, such as, e.g., the computing device 122 of FIGS. 1A-1D and/or the computing device 340 of FIG. 3. As described herein, the computing devices 122, 340 may use motion sensing modules (or motion sensors) having image capture components including, e.g., one or more video camera(s), one or more depth sensing camera(s), and/or various other similar types of devices or components. Further, these devices or components may be configured for motion capture including, e.g., 2D and 3D images of the angler while on the watercraft. These images may include data and information to determine and/or detect movement, orientation, intensity, range, gestures, etc. performed and/or executed by the angler while on the watercraft.

At block 410, method 300 may track movement of an angler on a watercraft. The movement may detect the angler transitioning from a first position on the watercraft to a second position on the watercraft. The second position may be different than the first position. The movement may also detect various gestures or body movements of the angler while on the watercraft. The movement may also detect turning of the angler's head in a forward facing direction of the angler's face.

At block 420, method 300 may detect an orientation of the angler based on the tracked movement of the angler. The orientation of the angler may refer to a position of the angler in relation to the bow (fore side), the stern (aft side), the port (left side), and/or the starboard (right side) of the watercraft. The orientation of the angler may also refer to a forward facing direction of the angler of the watercraft.

At block 430, method 300 may determine a direction of a cast executed by the angler based on the tracked movement and/or the detected orientation of the angler. The tracked movement may refer to various gestures or body movements of the angler while on the watercraft, including casting gestures performed or executed by the angler. For instance, the casting gestures may include overhead casting gestures and/or side casting gestures performed or executed by the angler. The cast executed by the angler may refer to a casting gesture performed by the angler.

At block 440, method 300 may detect an intensity of the cast executed by the angler based on the tracked movement of the angler. The intensity of the cast may refer to a speed or acceleration of a casting body part of the angler during the cast. The speed may be determined based on a rate of change of a transitional movement of the casting body part of the angler over a distance from a first position to a second position during a time period of the cast. The second position may be different than the first position.

At block 450, method 300 may determine a range of the cast based on the tracked movement of the angler and/or the detected intensity of the cast. This may include identifying a target area of the cast based on the determined range of the cast. The range of the cast may refer to a distance of the cast as calculated based on the intensity of the cast. The intensity may refer to a power, force, or strength of the cast.

At block 460, method 300 may display one or more sonar images on a display component based on the determined direction of the cast and/or the determined range of the cast. Further, this may include automatically focusing the display of the one or more sonar images to the identified target area of the cast. The one or more sonar images may include one or more 2D and/or 3D based sonar images of an underwater environment in a column of water where the watercraft is deployed. In various implementations, the display component may be configured to display the one or more sonar images based solely on the determined direction of the cast, based solely on the detected intensity of the cast, or based on the determined direction of the cast along with the detected intensity of the cast. Accordingly, in various implementations, the one or more sonar images may be displayed based solely on the direction of the cast, based solely on the range of the cast, or based on both the direction and range of the cast.

Figure 5:
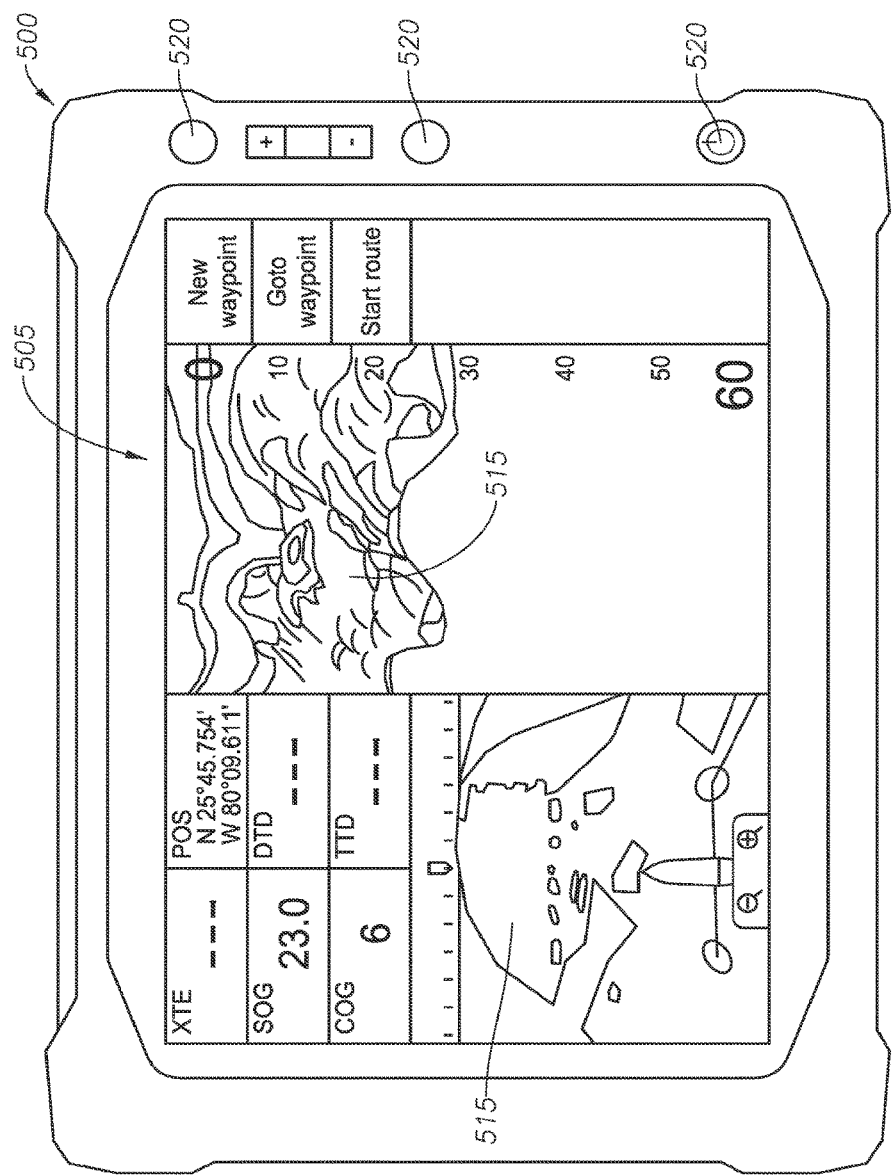
FIG. 5 illustrates a schematic of a marine electronics device in accordance with various implementations described herein.

FIG. 5 illustrates an instance schematic of a marine electronics device 500 in accordance with implementations of various techniques described herein. The marine electronics device 500 includes a screen 505. In some instances, the screen 505 may be sensitive to touching by a finger. In other instances, the screen 505 may be sensitive to body heat from a finger, a stylus, or responsive to a mouse. In various implementations, the marine electronics device 500 may be attached to various buses and/or networks, such as, e.g., the National Marine Electronics Association (NMEA) bus or network. The marine electronics device 500 may send and/or receive data to and/or from another device attached to the NMEA 2000 bus. For instance, the marine electronics device 500 may transmit commands and receive data from a motor or a sensor using an NMEA 2000 bus. In some implementations, the marine electronics device 500 may be capable of steering a vessel and controlling the speed of the vessel, i.e., autopilot. For instance, one or more waypoints may be input to the marine electronics device 500, and the marine electronics device 500 may be configured to steer the vessel to the one or more waypoints. Further, the marine electronics device 500 may be configured to transmit and/or receive NMEA 2000 compliant messages, messages in a proprietary format that do not interfere with NMEA 2000 compliant messages or devices, and/or messages in any other format. The marine electronics device 400 may be attached to various other communication buses and/or networks configured to use various other types of protocols that may be accessed via, e.g., NMEA 2000, NMEA 0183, Ethernet, Proprietary wired protocol, etc.

The marine electronics device 500 may be operational with numerous general purpose or special purpose computing system environments and/or configurations. The marine electronics device 500 may include any type of electrical and/or electronics device capable of processing data and information via a computing system. The marine electronics device 500 may include various marine instruments, such that the marine electronics device 500 may use the computing system to display and/or process the one or more types of marine electronics data. The device 500 may display marine electronic data 515, such as, e.g., sonar data and images associated with sonar data. The marine electronic data types 515 may include chart data, radar data, sonar data, steering data, dashboard data, navigation data, fishing data, engine data, and the like. The marine electronics device 500 may include a plurality of buttons 520, which may be include physical buttons or virtual buttons, or a combination thereof. The marine electronics device 500 may receive input through a screen 505 sensitive to touch or buttons 520.

The marine electronics device 500 may be configured as a computing system having a central processing unit (CPU), a system memory, a graphics processing unit (GPU), and a system bus that couples various system components including the system memory to the CPU. In various implementations, the computing system may include one or more CPUs, which may include a microprocessor, a microcontroller, a processor, a programmable integrated circuit, or a combination thereof. The CPU may include an off-the-shelf processor such as a Reduced Instruction Set Computer (RISC), or a Microprocessor without Interlocked Pipeline Stages (MIPS) processor, or a combination thereof. The CPU may also include a proprietary processor.

The GPU may be a microprocessor specifically designed to manipulate and implement computer graphics. The CPU may offload work to the GPU. The GPU may have its own graphics memory, and/or may have access to a portion of the system memory. As with the CPU, the GPU may include one or more processing units, and each processing unit may include one or more cores.

The CPU may provide output data to a GPU. The GPU may generate graphical user interfaces that present the output data. The GPU may also provide objects, such as menus, in the graphical user interface. A user may provide inputs by interacting with the objects. The GPU may receive the inputs from interaction with the objects and provide the inputs to the CPU. A video adapter may be provided to convert graphical data into signals for a monitor (MFD 500). The monitor (MFD 500) includes a screen 505. In various implementations, the screen 505 may be sensitive to touching by a human finger, and/or the screen 505 may be sensitive to the body heat from a human finger, a stylus, and/or responsive to a mouse.

The system bus may be any of several types of bus structures, including a memory bus or memory controller, a peripheral bus, and a local bus using any of a variety of bus architectures. By way of instance, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory may include a read only memory (ROM) and a random access memory (RAM). A basic input/output system (BIOS), containing the basic routines that help transfer information between elements within the computing system, such as during start-up, may be stored in the ROM.

The computing system may further include a hard disk drive interface for reading from and writing to a hard disk, a memory card reader for reading from and writing to a removable memory card, and an optical disk drive for reading from and writing to a removable optical disk, such as a CD ROM or other optical media. The hard disk, the memory card reader, and the optical disk drive may be connected to the system bus by a hard disk drive interface, a memory card reader interface, and an optical drive interface, respectively. The drives and their associated computer-readable media may provide nonvolatile storage of computer-readable instructions, data structures, program modules and other data for the computing system.

Although the computing system is described herein as having a hard disk, a removable memory card and a removable optical disk, it should be appreciated by those skilled in the art that the computing system may also include other types of computer-readable media that may be accessed by a computer. For instance, such computer-readable media may include computer storage media and communication media. Computer storage media may include volatile and non-volatile, and removable and non-removable media implemented in any method or technology for storage of information, such as computer-readable instructions, data structures, program modules, software modules, or other data. Computer-readable storage media may include non-transitory computer-readable storage media. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of instance, and not limitation, communication media may include wired media such as a wired network or direct-wired connection, and wireless media such as acoustic, radio frequency (RF), infrared (IR), and other wireless media. The computing system may include a host adapter that connects to a storage device via a small computer system interface (SCSI) bus, Fiber Channel bus, eSATA bus, or using any other applicable computer bus interface.

The computing system can also be connected to a router to establish a wide area network (WAN) with one or more remote computers. The router may be connected to the system bus via a network interface. The remote computers can also include hard disks that store application programs. In another implementation, the computing system may also connect to the remote computers via local area network (LAN) or the WAN. When using a LAN networking environment, the computing system may be connected to the LAN through the network interface or adapter. The LAN may be implemented via a wired connection or a wireless connection. The LAN may be implemented using Wi-Fi™ technology, cellular technology, Bluetooth™ technology, satellite technology, or any other implementation known to those skilled in the art. The network interface may also utilize remote access technologies (e.g., Remote Access Service (RAS), Virtual Private Networking (VPN), Secure Socket Layer (SSL), Layer 2 Tunneling (L2T), or any other suitable protocol). In some instances, these remote access technologies may be implemented in connection with the remote computers. It will be appreciated that the network connections shown are exemplary and other means of establishing a communications link between the computer systems may be used.

A number of program modules may be stored on the hard disk, memory card, optical disk, ROM or RAM, including an operating system, one or more application programs, and program data. In certain implementations, the hard disk may store a database system. The database system could include, for instance, recorded points. The application programs may include various mobile applications ("apps") and other applications configured to perform various methods and techniques described herein. The operating system may be any suitable operating system that may control the operation of a networked personal or server computer.

A user may enter commands and information into the computing system through input devices such as buttons, which may be physical buttons, virtual buttons, or combinations thereof. Other input devices may include a microphone, a mouse, or the like (not shown). These and other input devices may be connected to the CPU through a serial port interface coupled to system bus, but may be connected by other interfaces, such as a parallel port, game port or a universal serial bus (USB).

Certain implementations may be configured to be connected to a global positioning system (GPS) receiver system and/or a marine electronics system. The GPS system and/or marine electronics system may be connected via the network interface. The GPS receiver system may be used to determine position data for the vessel on which the marine electronics device 500 is disposed. The GPS receiver system may then transmit the position data to the marine electronics device 500. In other instances, any positioning system known to those skilled in the art may be used to determine and/or provide the position data for the marine electronics device 500.

The marine electronics system may include one or more components disposed at various locations on the vessel. Such components may include one or more data modules, sensors, instrumentation, and/or any other devices known to those skilled in the art that may transmit various types of data to the marine electronics device 500 for processing and/or display. The various types of data transmitted to the marine electronics device 500 from the marine electronics system may include marine electronics data and/or other data types known to those skilled in the art. The marine electronics data received from the marine electronics system may include chart data, sonar data, structure data, radar data, navigation data, position data, heading data, automatic identification system (AIS) data, Doppler data, speed data, course data, or any other type of data.

The marine electronics device 500 may receive external data via a network, such as a LAN or WAN. In various implementations, external data may relate to data and information not available from the marine electronics system. The external data may be retrieved from the Internet or any other source. The external data may include various environmental data, such as, e.g., atmospheric temperature, tidal data, weather, moon phase, sunrise, sunset, water levels, historic fishing data, and other fishing data.

In one implementation, the marine electronics device 500 may be a multi-function display (MFD) unit, such that the marine electronics device 500 may be capable of displaying and/or processing multiple types of marine electronics data. FIG. 5 illustrates a schematic diagram of an MFD unit in accordance with implementations of various techniques described herein. In particular, the MFD unit may include the computing system, the monitor (MFD 500), the screen 505, and the buttons 520 such that they may be integrated into a single console.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, instances of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For instance, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting

[the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as instance forms of implementing the claims.

What is claimed is:

1. A system comprising:
   a controller configured to:
      track, using at least one motion sensor, orientation of a user on a watercraft;
      determine a direction of a cast executed by the user based on the tracked orientation of the user; and
      determine one or more sonar transducers of the watercraft that are configured to capture one or more sonar images associated with the determined direction of the cast; and
   a display module configured to display the one or more sonar images from the determined one or more sonar transducers based on the determined direction of the cast executed by the user.

2. The system of claim 1 further comprising a first sonar transducer that is configured to face a first direction with respect to the watercraft and a second sonar transducer that is configured to face a second direction with respect to the watercraft, wherein the first direction is different than the second direction, and wherein the controller is configured to determine the one or more sonar transducers of the watercraft that are configured to capture one or more sonar images associated with the determined direction of the cast from among at least the first sonar transducer and the second sonar transducer.

3. The system of claim 1 further comprising at least one rotatable sonar transducer that is rotatable in a horizontal plane with respect to the watercraft, wherein the controller is configured to:
   determine the at least one rotatable sonar transducer to be the determined one or more sonar transducers that are configured to capture one or more sonar images associated with the determined direction of the cast; and
   instruct the at least one rotatable sonar transducer to rotate to face the determined direction of the cast.

4. The system of claim 3, wherein the at least one rotatable sonar transducer is rotatable up to 360 degrees with respect to the watercraft.

5. The system of claim 1 further comprising at least one pivotable sonar transducer that is pivotable in a vertical plane with respect to the watercraft, wherein the controller is configured to:
   determine the at least one pivotable sonar transducer to be the determined one or more sonar transducers that are configured to capture one or more sonar images associated with the determined direction of the cast; and
   instruct the at least one pivotable sonar transducer to pivot to face the determined direction of the cast.

6. The system of claim 5, wherein the at least one pivotable sonar transducer is pivotable between 0 degrees and 90 degrees in the vertical plane with respect to the watercraft.

7. The system of claim 1 further comprising at least one directionally-adjustable sonar transducer that is directionally-adjustable with respect to the watercraft, wherein the controller is configured to:
   determine the at least one directionally-adjustable sonar transducer to be the determined one or more sonar transducers that are configured to capture one or more sonar images associated with the determined direction of the cast; and
   instruct the at least one directionally-adjustable sonar transducer to directionally-adjust to the determined direction of the cast.

8. The system of claim 1 further comprising a motion sensor configured to track the orientation of a user on a watercraft.

9. The system of claim 8, wherein the motion sensor is contained within a wearable device that is associated with the user.

10. The system of claim 1, wherein the controller is configured to:
    detect an intensity of the cast executed by the user based on the tracked movements of the user; and
    determine, further based on the detected intensity of the cast, the one or more sonar transducers of the watercraft that are configured to capture one or more sonar images associated with the determined direction of the cast.

11. The system of claim 1, wherein the one or more sonar images comprise one or more two-dimensional (2D) sonar images of an underwater environment.

12. The system of claim 1, wherein the one or more sonar images comprise one or more three-dimensional (3D) sonar images of an underwater environment.

13. A non-transitory computer-readable medium having stored thereon a plurality of computer-executable instructions which, when executed by a computer, cause the computer to:
    receive motion capture data from one or more motion sensors configured to track movement of an angler on a watercraft;
    determine a direction of a cast by the angler based on the motion capture data;
    determine a target area of the cast based on the determined direction of the cast by the angler;
    determine one or more sonar transducers of the watercraft that are configured to capture one or more sonar images associated with the determined target area; and
    display one or more sonar images on a display from the determined one or more sonar transducers based on the determined target area.

14. The non-transitory computer-readable medium of claim 13, wherein the plurality of computer-executable instructions are further configured to cause the computer to determine the one or more sonar transducers of the watercraft that are configured to capture one or more sonar images associated with the determined target area from among at least a first sonar transducer and a second sonar transducer, wherein the first sonar transducer is configured to face a first direction with respect to the watercraft and the second sonar transducer is configured to face a second direction with respect to the watercraft, wherein the first direction is different than the second direction.

15. The non-transitory computer-readable medium of claim 13, wherein the plurality of computer-executable instructions are further configured to cause the computer to:
determine at least one rotatable sonar transducer to be the determined one or more sonar transducers that are configured to capture one or more sonar images associated with the determined target area, wherein the at least one rotatable sonar transducer is rotatable in a horizontal plane with respect to the watercraft; and
instruct the at least one rotatable sonar transducer to rotate to face the determined target area.

16. The non-transitory computer-readable medium of claim 13, wherein the plurality of computer-executable instructions are further configured to cause the computer to:
determine at least one pivotable sonar transducer to be the determined one or more sonar transducers that are configured to capture one or more sonar images associated with the determined target area, wherein the at least one pivotable sonar transducer is pivotable in a vertical plane with respect to the watercraft; and
instruct the at least one pivotable sonar transducer to pivot to face the determined target area.

17. The non-transitory computer-readable medium of claim 13, wherein the plurality of computer-executable instructions are further configured to cause the computer to:
determine at least one directionally-adjustable sonar transducer to be the determined one or more sonar transducers that are configured to capture one or more sonar images associated with the determined target area, wherein the at least one directionally-adjustable sonar transducer is directionally-adjustable with respect to the watercraft; and
instruct the at least one directionally-adjustable sonar transducer to directionally-adjust to the determined target area.

18. The non-transitory computer-readable medium of claim 13, wherein the plurality of computer-executable instructions are further configured to cause the computer to:
detect an intensity of the cast by the angler based on the motion capture data; and
determine, further based on the detected intensity of the cast, the target area of the cast.

19. A method comprising:
receiving, from at least one motion sensor, motion capture data corresponding to movement of an angler on a watercraft;
determining, by a computer, a direction of a cast by the angler based on the motion capture data;
determining one or more sonar transducers of the watercraft that are configured to capture one or more sonar images associated with the determined direction of the cast; and
causing display of one or more sonar images on a display from the determined one or more sonar transducers based on the determined direction of the cast.

20. The method of claim 19 further comprising:
determining at least one rotatable sonar transducer to be the determined one or more sonar transducers that are configured to capture one or more sonar images associated with the determined direction of the cast, wherein the at least one rotatable sonar transducer is rotatable in a horizontal plane with respect to the watercraft; and
causing the at least one rotatable sonar transducer to rotate to face the determined direction of the cast.

* * * * *

UNITED STATES PATENT AND TRADEMARK OFFICE
CERTIFICATE OF CORRECTION

PATENT NO. : 10,114,470 B2
APPLICATION NO. : 15/813782
DATED : October 30, 2018
INVENTOR(S) : Jeremiah Clark Page 1 of 1

It is certified that error appears in the above-identified patent and that said Letters Patent is hereby corrected as shown below:

On the Title Page

(73) Assignee: NAVICO HOLDINGS AS, Egersund (NO)
Should read as:
(73) Assignee: NAVICO HOLDING AS, Egersund (NO)

Signed and Sealed this
Nineteenth Day of March, 2019

Andrei Iancu
*Director of the United States Patent and Trademark Office*